US010418748B2

(12) United States Patent
Wang et al.

(10) Patent No.: US 10,418,748 B2
(45) Date of Patent: Sep. 17, 2019

(54) FIRE-RATED THREE-WAY SPLICE ASSEMBLY

(71) Applicant: Pentair Flow Services AG, Schaffhausen (CH)

(72) Inventors: Jimmy Wang, Millbrae, CA (US); Helene Raymond, Grafton (CA); Ryan Drury, Quinte West (CA); Wesley Dong, Belmont, CA (US)

(73) Assignee: nVent Services GmbH, Schaffhausen (CH)

( * ) Notice: Subject to any disclaimer, the term of this patent is extended or adjusted under 35 U.S.C. 154(b) by 0 days.

(21) Appl. No.: 15/905,500

(22) Filed: Feb. 26, 2018

(65) Prior Publication Data

US 2018/0248301 A1 Aug. 30, 2018

Related U.S. Application Data

(60) Provisional application No. 62/463,169, filed on Feb. 24, 2017.

(51) Int. Cl.
*H01R 13/527* (2006.01)
*H01R 4/70* (2006.01)
(Continued)

(52) U.S. Cl.
CPC .............. *H01R 13/527* (2013.01); *H01R 4/70* (2013.01); *H01R 9/223* (2013.01);
(Continued)

(58) Field of Classification Search
CPC .... H01H 9/085; H01H 2009/108; H01R 4/70; H01R 9/223; H01R 9/245; H01R 9/2408;
(Continued)

(56) References Cited

U.S. PATENT DOCUMENTS 2,659,765 A    11/1953  Dunn
3,941,917 A *   3/1976  Barrow .................. H02G 3/083
                                              174/653
(Continued)

FOREIGN PATENT DOCUMENTS

CA    2331554 A1 *  7/2001
CA    2331554 A1 *  7/2001  ............... H02G 3/08

*Primary Examiner* — Timothy J Thompson
*Assistant Examiner* — Guillermo J Egoavil
(74) *Attorney, Agent, or Firm* — Quarles & Brady LLP

(57) ABSTRACT

A three-way splice assembly for splicing together a first cable, a second cable, and a third cable. The assembly includes an exterior enclosure, an interior enclosure positioned within the exterior enclosure, and an insulation layer positioned between the exterior enclosure and the interior enclosure. The assembly also includes a first port, a second port, and a third port, each extending from the exterior enclosure, through the insulation layer, and into the interior enclosure and each sized to receive one of the first cable, the second cable, and the third cable, respectively. The assembly further includes a terminal configured to electrically connect a respective conductor from the first cable, the second cable, and the third cable to form a three-way splice, and a fuse configured to be electrically connected between the terminal and one of the conductors of the first cable, the second cable, and the third cable.

20 Claims, 15 Drawing Sheets

(51) Int. Cl.
*H02G 15/10* (2006.01)
*H02G 3/04* (2006.01)
*H01R 9/22* (2006.01)
*H01R 13/688* (2011.01)
*H01R 9/24* (2006.01)

(52) U.S. Cl.
CPC ........... *H02G 3/0412* (2013.01); *H02G 15/10* (2013.01); *H01R 9/2408* (2013.01); *H01R 13/688* (2013.01)

(58) Field of Classification Search
CPC .. H01R 9/2433; H01R 13/052; H01R 13/527; H01R 13/688; H02G 3/08; H02G 3/083; H02G 3/0412; H02G 15/10; H05K 5/02
USPC .................................... 174/88 R, 65 R, 77 R
See application file for complete search history.

(56) References Cited

U.S. PATENT DOCUMENTS

| | | |
|---|---|---|
| 4,176,245 A | 11/1979 | Merlack et al. |
| 4,667,840 A | 5/1987 | Lindsey |
| 5,816,850 A * | 10/1998 | Yamada ................. H01H 9/085 439/507 |
| 5,962,811 A | 10/1999 | Rodrigues et al. |
| 6,274,809 B1 | 8/2001 | Pudims et al. |
| 6,642,446 B2 | 11/2003 | Dodds et al. |
| 6,677,519 B2 | 1/2004 | Rumsey et al. |
| 6,711,337 B2 | 3/2004 | Hodge et al. |
| 6,736,715 B2 | 5/2004 | Kuhn |
| 7,339,115 B2 | 3/2008 | Konnik |
| 7,812,253 B2 | 10/2010 | Moselle |
| 7,908,746 B2 | 3/2011 | Cox |
| 8,365,936 B2 | 2/2013 | Cox |
| 9,490,618 B2 | 11/2016 | Garvin |

* cited by examiner

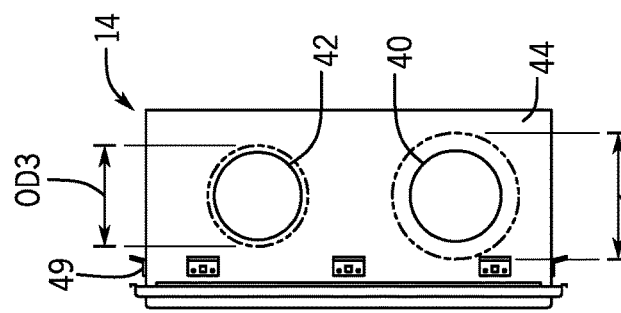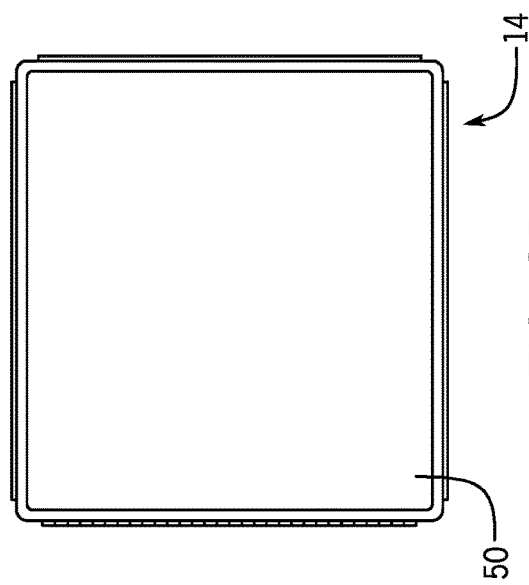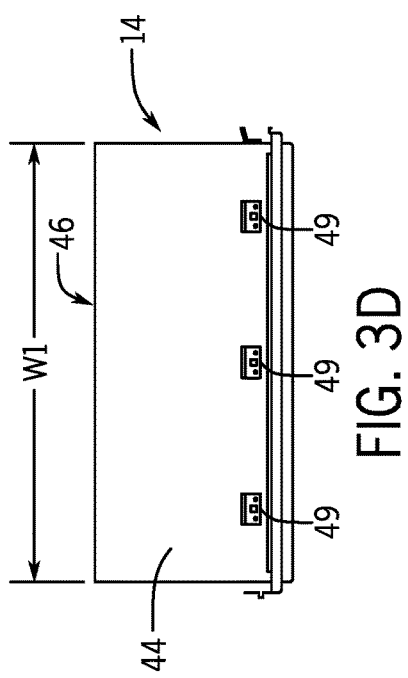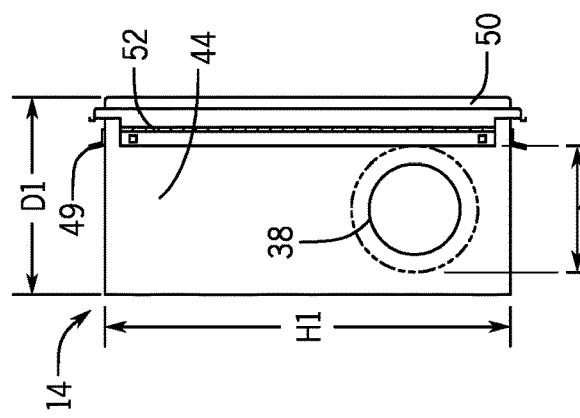

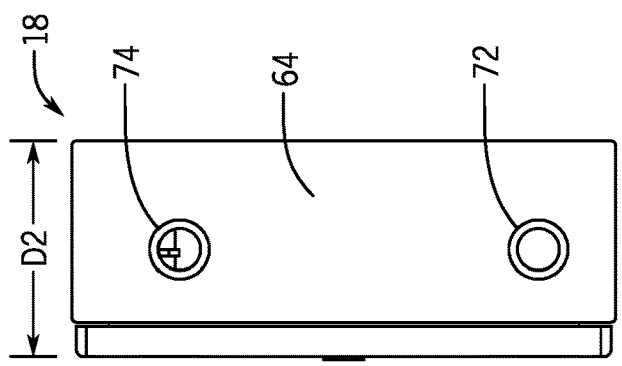
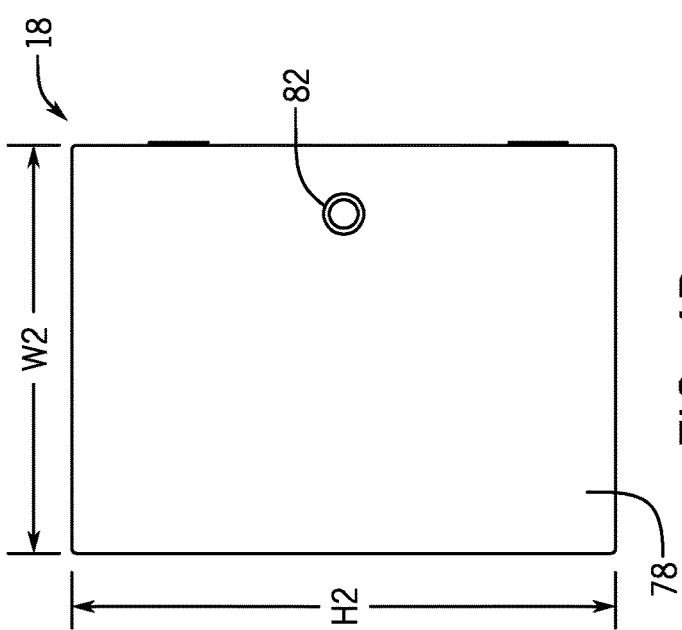
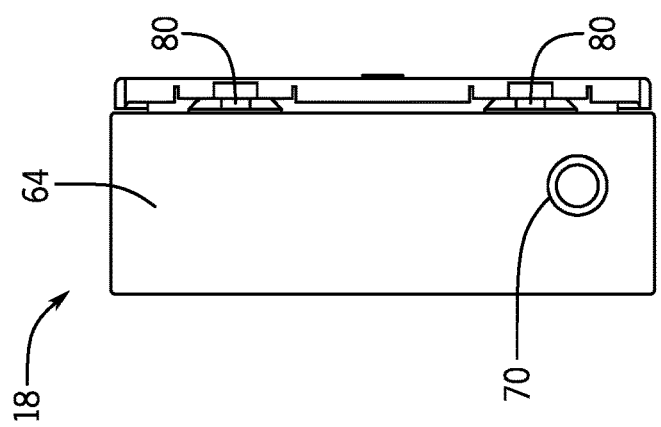

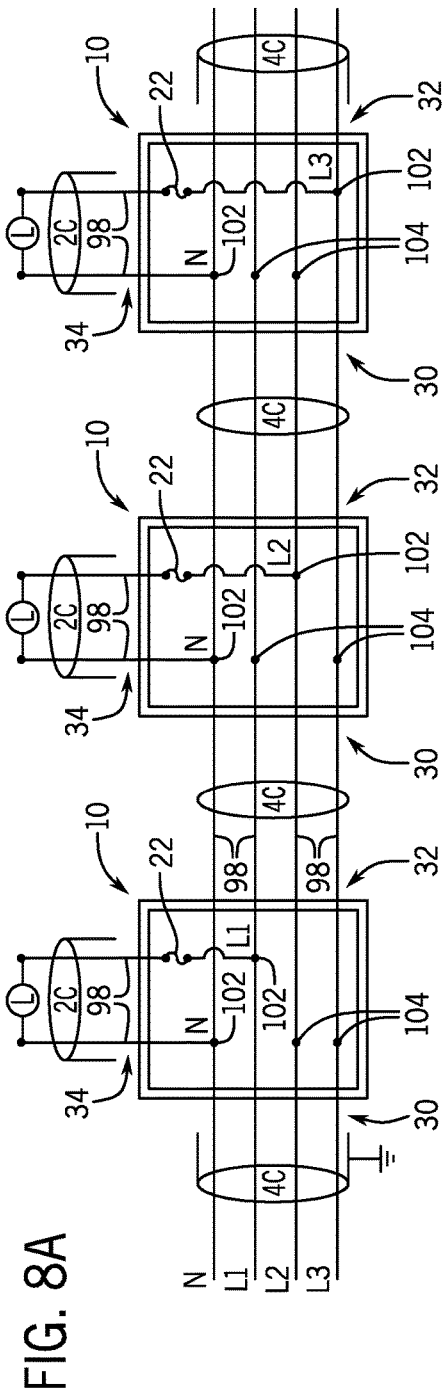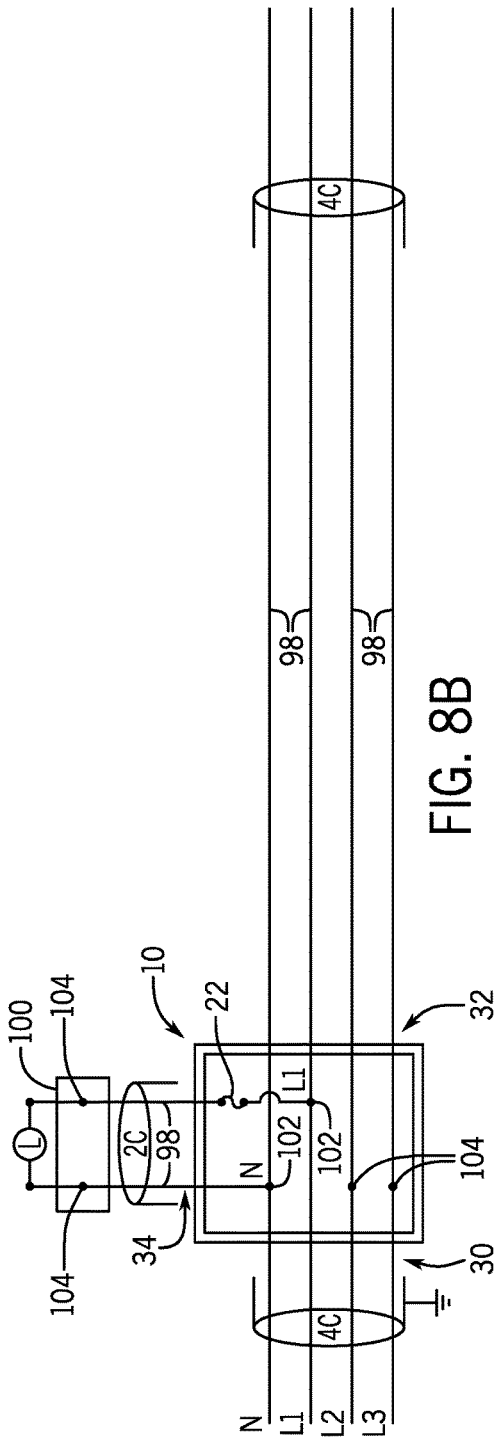
FIG. 8A
FIG. 8B

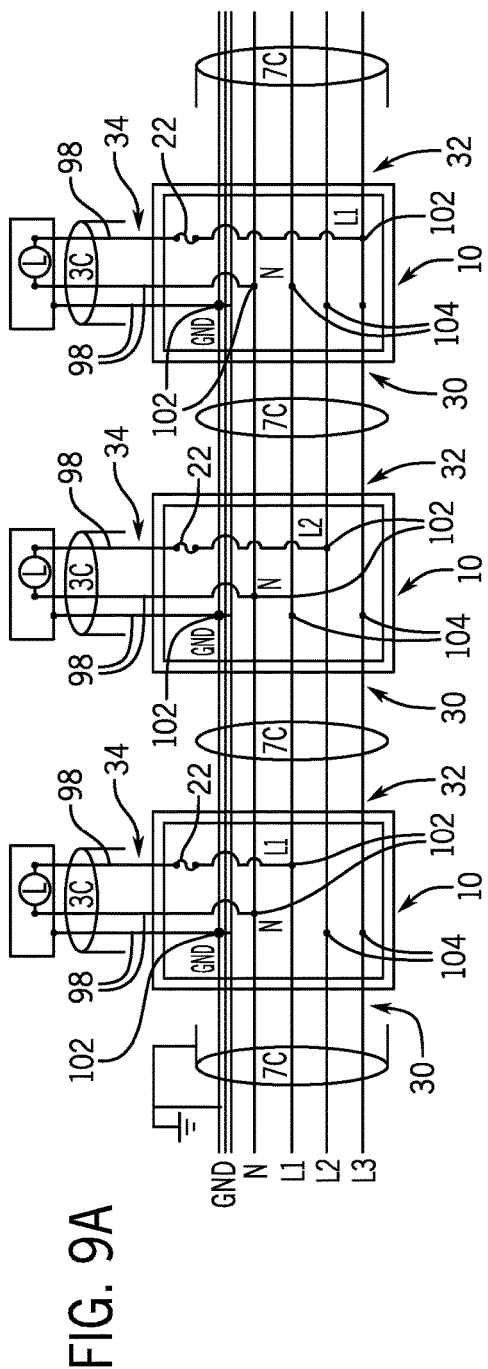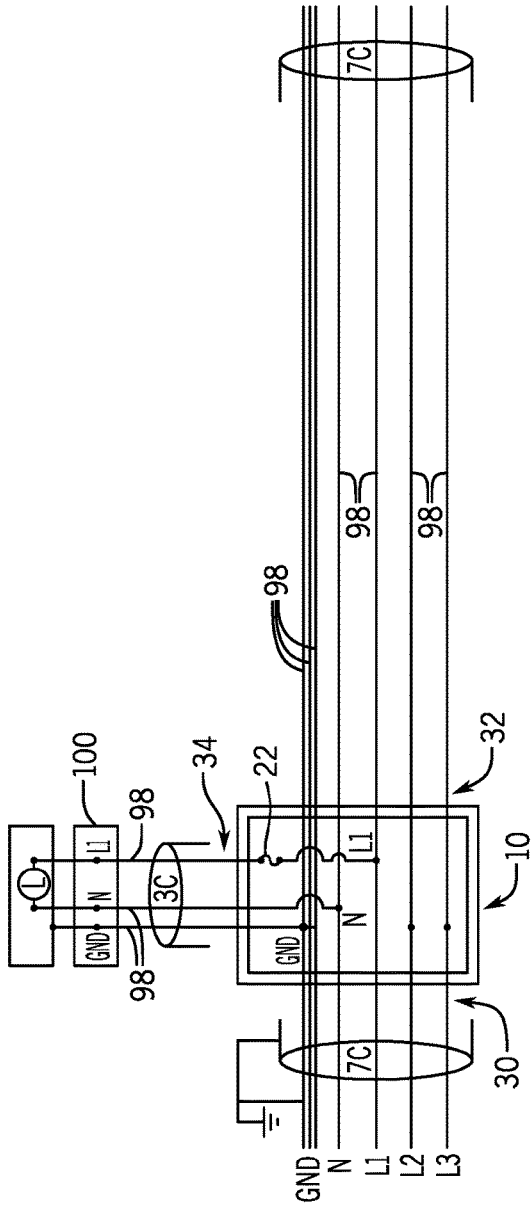
FIG. 9A
FIG. 9B

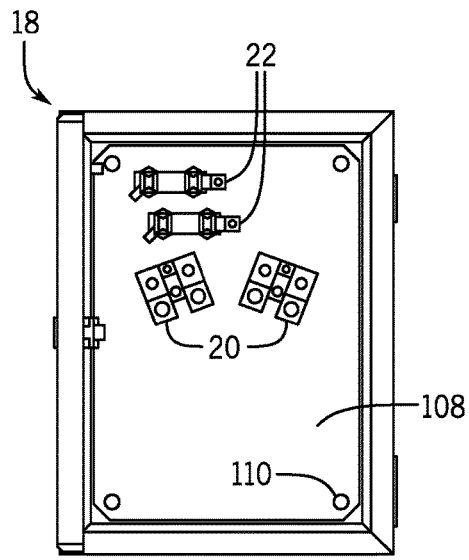
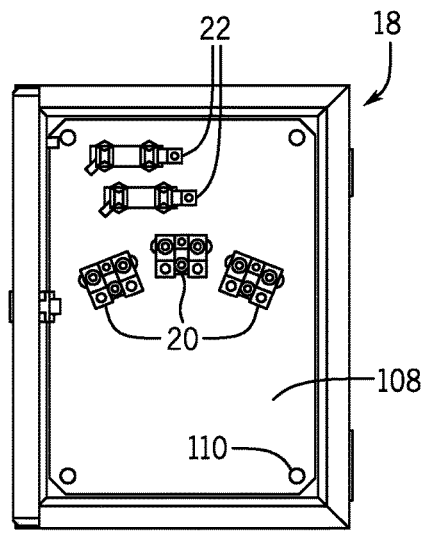
FIG. 10A          FIG. 10B
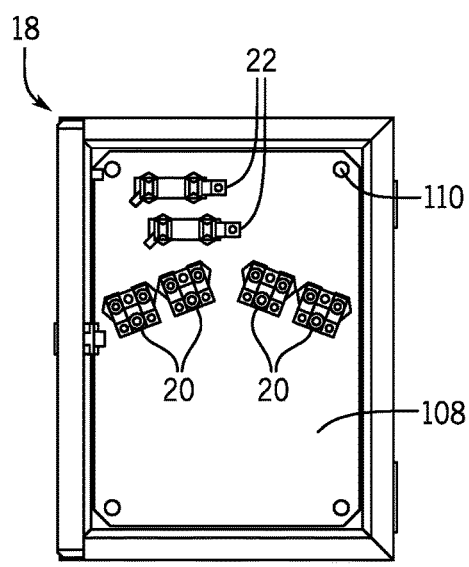
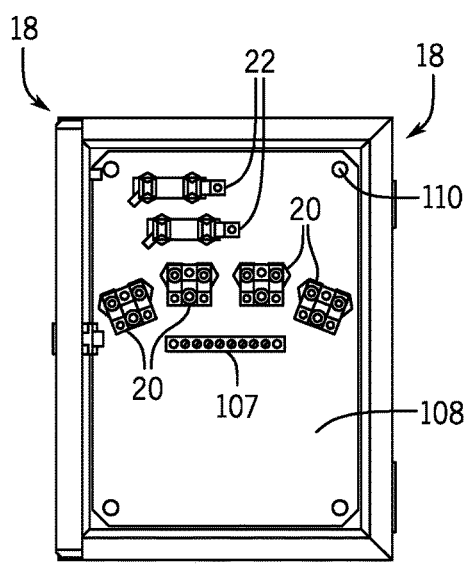
FIG. 10C          FIG. 10D

FIRE-RATED THREE-WAY SPLICE ASSEMBLY

RELATED APPLICATIONS

This application claims priority under 35 U.S.C. § 119 to U.S. Provisional Patent Application No. 62/463,169 filed on Feb. 24, 2017, the entire contents of which is incorporated herein by reference.

BACKGROUND OF THE INVENTION

Mineral insulated (MI) cables generally include one or more conductors surrounded by mineral insulation, such as magnesium oxide powder, which is tightly packed inside a conductive, typically copper or steel, tubular sheath. With this construction, MI cables are compact, fire-resistant, and protected from electromagnetic interference. As such, MI cables are often used in applications where high power output, high exposure temperatures, or extreme resistance to environmental corrosives are needed. For example, these cables are often used in wiring systems where enhanced fire protection of electrical connections is necessary, such as fire and smoke alarm systems. These cables are also useful in enclosed areas, such as electrical or lighting systems for tunnel, subway, underground railway, or underground roadway applications.

Lengths of MI cable may be joined together using splice kits (or splices), for example, in cases where a cable's manufactured length is shorter than the run length or part of a cable is damaged and needs repair or replacement. To splice two MI cables together, each cable end is terminated by first stripping away the sheath and exposing the insulation and the conductors. The exposed insulation is then covered by one or more materials for protection against outside substances, moisture, and/or heat. Once the two MI cables are terminated, the exposed conductors of each cable are physically and electrically coupled together. To be fire-rated under the requirements of UL 2196, and thus usable in systems where enhanced fire protection is necessary, a splice kit must protect the internal cable conductors enough to permit circuit operation at increasing temperatures up to 1700 degrees Fahrenheit after one hour (for a one-hour rating) or up to 1850 degrees Fahrenheit after two hours (for a two-hour rating). The splice kit must also withstand mechanical impact resulting from water hose exposure.

Currently, factory-installed and field-installed fire-rated splice kits exist for joining two MI cables together (that is, two-way splicing). However, no kits or systems exist that provide fire-rated three-way splicing or T-splicing; users may attempt to patch together unlisted products with their own construction methods, but such patchwork installations cannot be listed as fire-rated systems under the above fire-listing requirements.

Therefore, what is needed is an integrated solution for a fire-rated three-way splice.

SUMMARY OF THE INVENTION

In one embodiment of the present invention, a three-way splice assembly for splicing together a first cable, a second cable, and a third cable is provided. The three-way splice assembly includes an exterior enclosure, an interior enclosure positioned within the exterior enclosure, and an insulation layer positioned between the exterior enclosure and the interior enclosure. The three-way splice assembly also includes a first port, a second port, and a third port each extending from the exterior enclosure, through the insulation layer, and into the interior enclosure. The ports are each sized to receive one of the first cable, the second cable, and the third cable, respectively. The three-way splice assembly further includes a terminal located within the interior enclosure and configured to electrically connect a respective conductor from the first cable, the second cable, and the third cable to form a three-way splice, and a fuse located within the interior enclosure and configured to be electrically connected between the terminal and one of the conductors of the first cable, the second cable, and the third cable.

In another embodiment, a three-way splice assembly for connecting a branch circuit line to a main power line is provided. The main power line includes a first main power line and a second main power line, and each of the branch circuit line, the first main power line, and the second main power line includes a mineral insulated cable having at least one conductor. The three-way splice assembly includes an exterior enclosure, an interior enclosure positioned within the exterior enclosure, and an insulation layer positioned between the exterior enclosure and the interior enclosure. The three-way splice assembly also includes a first port extending from the exterior enclosure, through the insulation layer, and into the interior enclosure and sized to receive the first main power line, a second port extending from the exterior enclosure, through the insulation layer, and into the interior enclosure and sized to receive the second main power line, and a third port extending from the exterior enclosure, through the insulation layer, and into the interior enclosure and sized to receive the branch circuit line. The three-way splice assembly further includes a terminal located within the interior enclosure and configured to electrically connect a respective conductor from the first main power line, the second main power line, and the branch circuit line to form a three-way splice, and a fuse located within the interior enclosure and configured to be electrically connected between the terminal and the conductor of the branch circuit line.

In another embodiment, a three-way splice assembly for splicing together a first cable, a second cable, and a third cable is provided. The three-way splice assembly includes an exterior enclosure, an interior enclosure, and an insulation layer. The exterior enclosure includes five closed sides, an open front, and a door configured to cover the open front. The interior enclosure is positioned within the exterior enclosure and includes five closed sides, an open front, and a door configured to cover the open front. The insulation layer is positioned between the exterior enclosure and the interior enclosure. The three-way splice assembly also includes a first port, a second port, and a third port each extending from the exterior enclosure, through the insulation layer, and into the interior enclosure and each sized to receive one of the first cable, the second cable, and the third cable, respectively. The three-way splice assembly further includes a terminal located within the interior enclosure and configured to electrically connect a respective conductor from the first cable, the second cable, and the third cable to form a three-way splice.

These and other aspects of the invention will become apparent from the following description. In the description, reference is made to the accompanying drawings which form a part hereof, and in which there is shown embodiments of the invention. Such embodiments do not necessarily represent the full scope of the invention and reference is made therefore, to the claims herein for interpreting the scope of the invention.

BRIEF DESCRIPTION OF THE DRAWINGS

The present disclosure will hereafter be described with reference to the accompanying drawings, wherein like reference numerals denote like elements.

FIGS. 3A-3D are first side, front, top, and second side views, respectively, of an exterior enclosure of the fire-rated three-way splice assembly of FIG. 1.

FIGS. 4A-4C are first side, front, and second side views, respectively, of an interior enclosure of the fire-rated three-way splice assembly of FIG. 1.

FIGS. 8A-8B illustrate wiring diagrams for a fire-rated three-way splice assembly configured to splice a branch circuit with a four-conductor main line.

FIGS. 9A-9B illustrate wiring diagrams for a fire-rated three-way splice assembly configured to splice a branch circuit with a seven-conductor main line.

FIGS. 10A-10D are front views of terminal configurations for a fire-rated three-way splice assembly operable with a two-conductor main line, a three-conductor main line, a four-conductor main line, and a seven-conductor main line, respectively.

DETAILED DESCRIPTION OF PREFERRED EMBODIMENTS

Before the present invention is described in further detail, it is to be understood that the invention is not limited to the particular aspects described. It is also to be understood that the terminology used herein is for the purpose of describing particular aspects only, and is not intended to be limiting. The scope of the present invention will be limited only by the claims. As used herein, the singular forms "a", "an", and "the" include plural aspects unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Aspects referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

Figure 1:
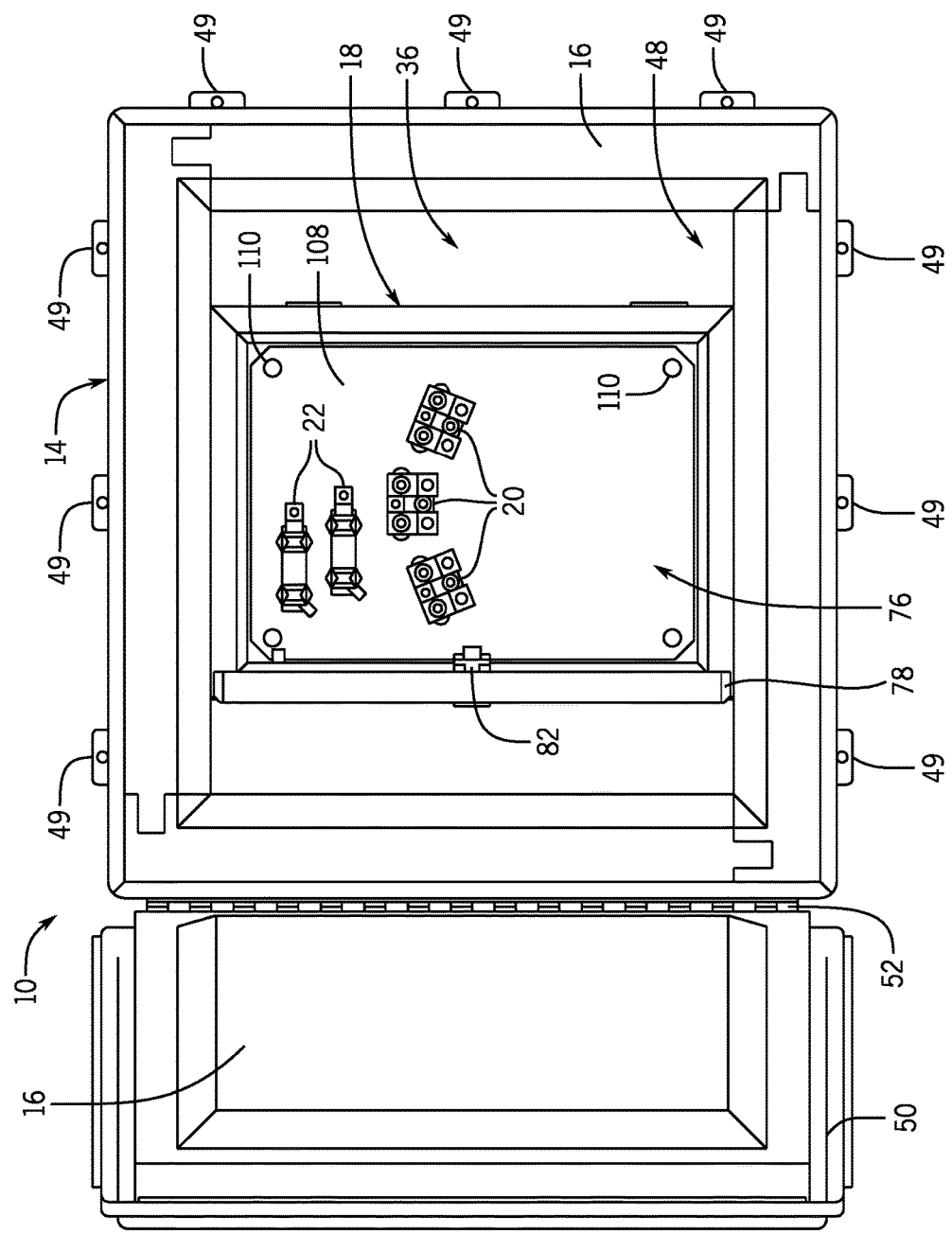
FIG. 1 is a front view of a fire-rated three-way splice assembly according to one embodiment of the invention.
Figure 2:
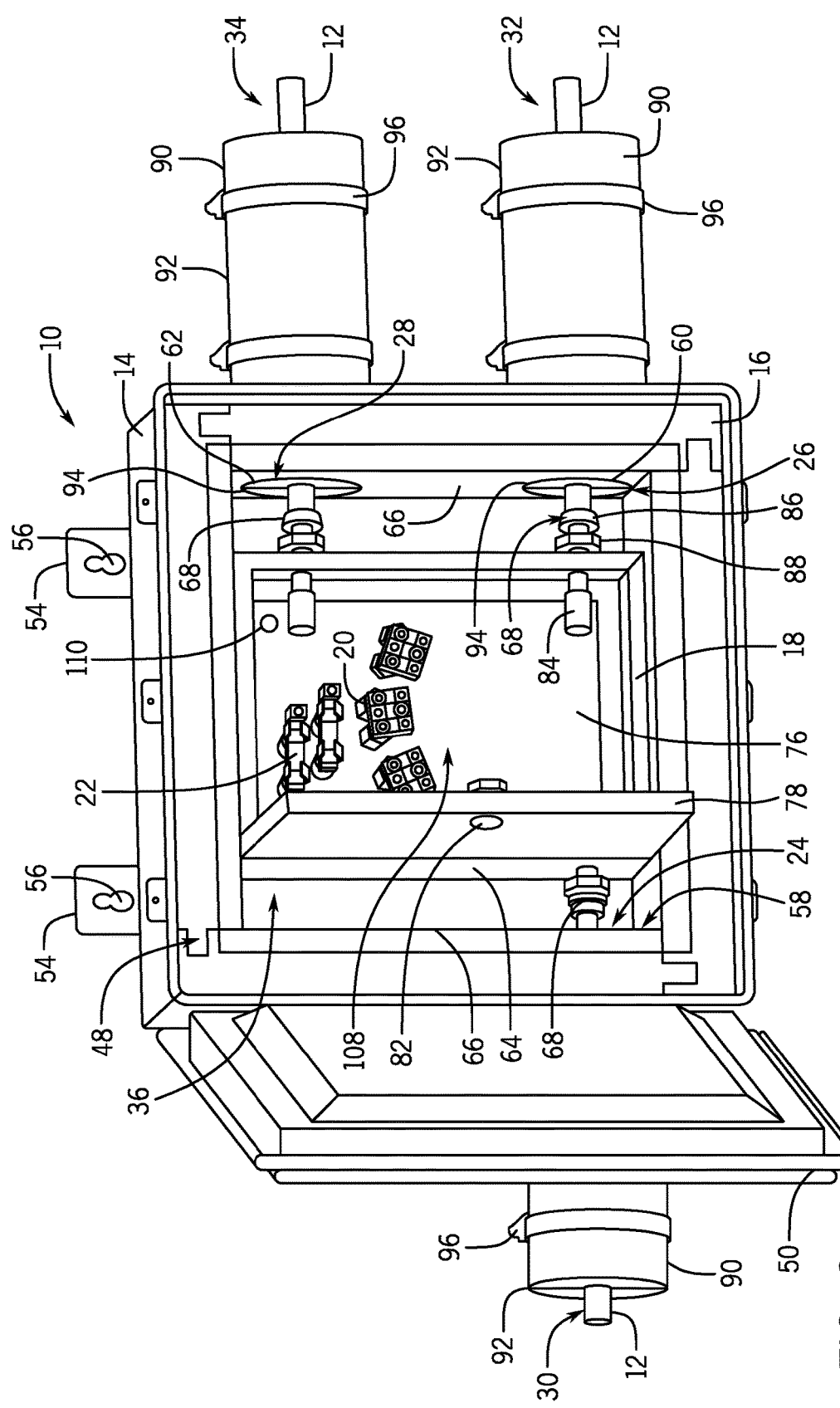
FIG. 2 is a front perspective view of the fire-rated three-way splice assembly of FIG. 1 with cables routed into the assembly.

FIG. 1 illustrates a fire-rated three-way splice assembly 10 according to some embodiments of the invention. The three-way splice assembly 10 can be used with electrical cables, such as mineral insulated (MI) cables 12, as shown in FIG. 2. More specifically, the three-way splice assembly 10 can join together three individual lengths of MI cables 12 in a T-splice configuration. In some embodiments, the three-way splice assembly 10 can provide a fire-rated, turnkey solution for applications that require operation under potentially high exposure temperatures, such as electrical lighting systems in tunnel, subway, underground railway, or underground roadway applications. The assembly 10 may also be used in other applications, such as above-ground lighting systems, life safety or emergency electrical systems, fire alarm systems, smoke alarm systems, or other electrical systems. In some applications, the assembly 10 can be used as a splice for connecting a branch lighting circuit to a main power line and, as described below, can protect the main power line when the branch circuit fails, for example, due to a fire.

As shown in FIG. 1, the splice assembly 10 can include an exterior enclosure 14, insulation 16, an interior enclosure 18, one or more terminals 20, and one or more fuses 22. Generally, the interior enclosure 18 can be positioned within the exterior enclosure 14 and the insulation 16 can be positioned between the exterior enclosure 14 and the interior enclosure 18. The assembly 10 can further include three ports 24, 26, 28 that each extend from the exterior enclosure 14, through the insulation 16, and into the interior enclosure 18 and are configured to receive the MI cables 12 therethrough. For example, as shown in FIG. 2, main line cables 30, 32 and a branch circuit cable 34 can be routed into the assembly 10 through the ports 24, 26, 28, respectively.

As shown in FIGS. 1 and 2, the exterior enclosure 14 can be sized to contain at least a layer of the insulation 16 and the interior enclosure 18. Furthermore, the exterior enclosure 14 can be sized to contain the insulation 16 and the interior enclosure 18 in an arrangement that creates air gap 36 between the insulation 16 and the interior enclosure 18, as further described below. In one embodiment, as shown in FIGS. 3A-3D, the exterior enclosure 14 can be about 16.15 inches in height (H1) by about 17.55 inches in width (W1) by about 8 inches in depth (D1). Also, the exterior enclosure 14 can include first and second through-holes 38, 40 as part of the first and second ports 24, 26, respectively, that are about 5 inches in diameter (OD1, OD2), and a third through-hole 42 as part of the third port 28 that is about 4 inches in diameter (OD3). In other embodiments, however, the through-holes 38-42 may be equal or different in size and may include diameters other than what is specifically described herein.

Generally, the exterior enclosure 14 can be enclosed on five sides. For example, as shown in FIGS. 1 and 2 and 3A-3D, the exterior enclosure 14 can include four closed sides 44, a closed back or rear side 46, and an open front 48. In some embodiments, as shown in FIGS. 2, 3A, and 3C, the through-holes 38, 40, 42 can be positioned on the sides 44. Furthermore, the exterior enclosure 14 can include door 50 sized to cover the open front 48, as shown in FIGS. 1-3C. The door 50 can substantially seal the inside of the exterior enclosure 14 (in a closed position) as well as provide access to the inside of the exterior enclosure 14 (in an open position). In some embodiments, the door 50 can be hinged on one of the sides 44 (e.g., via a hinge 52, as shown in FIGS. 1 and 3A) and can include a latch (not shown) that locks the door 50 in the closed position to enclose and substantially seal an inside portion of the exterior enclosure 14. Additionally, in some embodiments, as shown in FIG. 1, the exterior enclosure 14 can include one or more tabs 49 around the sides 44 configured to assist locking the door 50 in the closed position (e.g., via screws or hooks (not shown) configured to couple the door 50 to the tabs 49).

Figure 12:
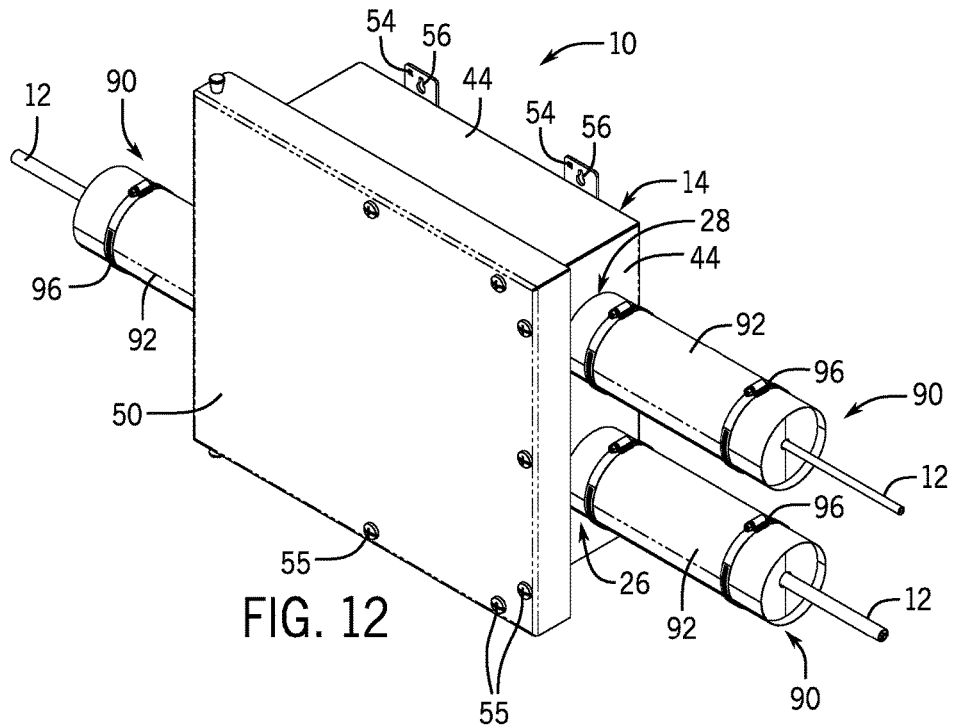
FIG. 12 is a front perspective view of a fire-rated three-way splice assembly, according to another embodiment of the invention, in a closed configuration and with cables routed into the assembly.
Figure 13:
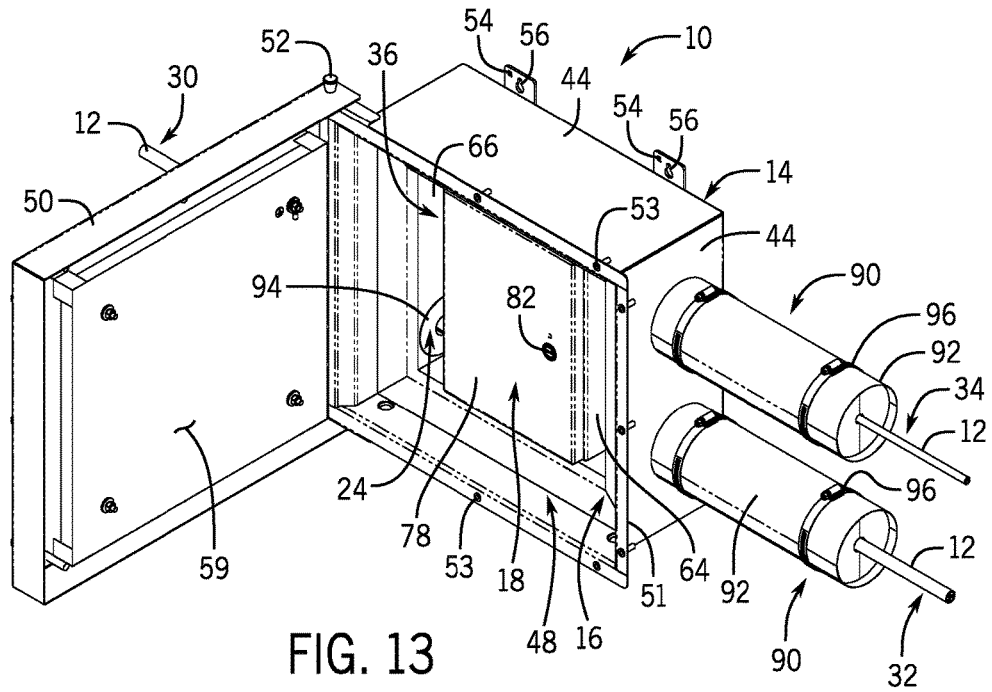
FIG. 13 is a front perspective view of the fire-rated three-way splice assembly of FIG. 12 in an open configuration.

Additionally, FIGS. 12-18 illustrate a splice assembly 10, according to another embodiment of the invention, having a different door configuration. More specifically, as shown in FIGS. 12 and 13, the door 50 can include a hinge 52 and can be sized to extend over the sides 44 when in the closed position. Furthermore, similar to the tabs 49 of FIG. 1, the sides 44 can each include an outer lip 51 including one or more apertures 53. The door 50 can include mating apertures (not shown) so that fasteners 55 can be routed through the apertures 53 of the door 50 and the lip 51 to lock the door 50 in the closed position, as shown in FIG. 12. Alternatively, in some embodiments, the exterior enclosure 14 can include a door 50 that can be completely removed from the enclosure 14 and attached via fasteners, such as quick removable snap hinges.

Furthermore, in some embodiments, as shown in FIGS. 2 and 12-14, the exterior enclosure 14 can include one or more mounting brackets 54. Each mounting bracket 54 can include an aperture 56 sized to receive a fastener (not shown) for mounting the splice assembly 10 to a mounting surface, such as a wall. For example, the mounting brackets 54 can be coupled to or integral with the back 46 or sides 44 of the exterior enclosure 14 in order to facilitate mounting the assembly 10 so that the back 46 abuts the mounting surface. In another example, the mounting brackets 54 can be arranged on the exterior enclosure 14 in order to facilitate mounting the assembly 10 so that one of the sides 44 abuts the mounting surface.

In some embodiments, the exterior enclosure 14 can be configured to seal against ingress of humidity and/or splashing water. Furthermore, in some embodiments, the exterior enclosure 14 can be configured to hold the insulation 16 in place and protect it from, for example, mechanical damage and weather. The exterior enclosure 14 can therefore be substantially light weight. For example, in one embodiment, the exterior enclosure 14 can be made of stainless steel of about 0.060-inch thickness, or thinner. In another embodiment, the exterior enclosure 14 can be made of 15- to 18-gauge stainless steel. In other embodiments, however, the exterior enclosure 14 can be made of thicker stainless steel or other metals and can be configured to seal out elements in compliance with a NEMA Type 4 rating, or another NEMA type rating.

Figure 15:
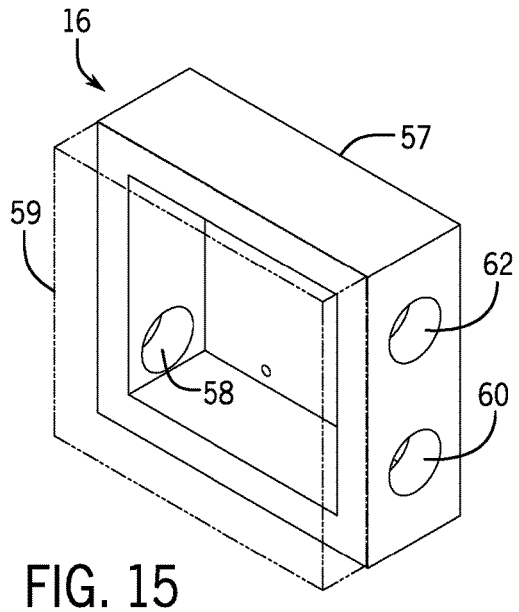
FIG. 15 is a front perspective view of an insulation layer of the fire-rated three-way splice assembly of FIG. 12.

While the exterior enclosure 14 can generally serve mechanical functions such as sealing out elements and moisture from inside the assembly 10, the insulation 16 can help act as a heat barrier. More specifically, as shown in FIGS. 1, 2, and 13, the insulation 16 can be coupled to or positioned against one or more inner surfaces of the exterior enclosure 14 and can provide heat protection for electrical connections within the interior enclosure 18, as further described below. In some embodiments, as shown in FIG. 15, the insulation 16 can include a base portion 57 configured to be positioned within the exterior enclosure 14 and a door portion 59 configured to be coupled to the door 50. In one embodiment, a thickness of the base portion 57 of the insulation layer 16 can be about two inches along the sides 44 of the exterior enclosure 14 and about one inch along the rear 46 of the exterior enclosure 14, and a thickness of the door portion 59 (e.g., along the front 48 of the exterior enclosure 14) can be about two inches. As shown in FIGS. 1 and 15, along sides of the base portion 57, the insulation 16 can include first, second, and third through-holes 58, 60, 62 that align with and have about equal diameters to the first, second, and third through-holes 38, 40, 42, respectively, of the exterior enclosure 14. Additionally, in one embodiment, the insulation 16 can comprise calcium silicate. However, other insulation materials may be used in other embodiments.

As mentioned above and shown in FIGS. 1, 2, and 13, the interior enclosure 18 can be positioned within the exterior enclosure 14. The interior enclosure 18 can also be substantially surrounded on all sides by the insulation 16. Generally, the interior enclosure 18, the exterior enclosure 14, and the insulation 16 can be sized and configured relative to one another so that an air gap 36 is defined at least between outer sides 64 of the interior enclosure 18 and inner sides 66 of the insulation 16, as shown in FIGS. 1, 2, and 13. The air gap 36 can be sized to permit access to cable glands 68, as shown in FIG. 2 and further described below. In one embodiment, as shown in FIGS. 4A-4C, the interior enclosure 18 can be about 12 inches in height (H2) by about 9 inches in width (W2) by about 4.78 inches in depth (D2). Additionally, in some embodiments, the interior enclosure 18, the exterior enclosure 14, and the insulation 16 can be sized and configured relative to one another without an air gap. For example, in such embodiments, the outer sides 64 of the interior enclosure 18 can contact the inner sides 66 of the insulation 16.

Additionally, the interior enclosure 18 can be coupled to the insulation 16 and/or the exterior enclosure 14. In one embodiment, one side (such as a rear side) of the interior enclosure 18 can be coupled to one side (such as the rear side 46) of the exterior enclosure 14 through, for example, welded studs, thus sandwiching the insulation 16 between the rear sides of the enclosures 14, 18. In other embodiments, however, the interior enclosure 18 can be set within or coupled to the exterior enclosure 14 or the insulation 16 through other coupling methods.

As shown in FIGS. 4A-4C and 16, the interior enclosure 18 can include first, second, and third through-holes 70, 72, 74 that align with the through-holes 38, 40, 42 of the exterior enclosure 14 and the through-holes 58, 60, 62 of the insulation 16, respectively. Furthermore, the first, second, and third through-holes 70-74 can generally be smaller than the through-holes 38-42, 58-62 of the exterior enclosure 14 and the insulation 16. For example, the through-holes 70-74 can be sized to receive cable glands 68, as shown in FIG. 2. In some embodiments, the first, second, and third through-holes 70-74 can be threaded ports, each with a diameter of about 0.75 inches, about 1 inch, or about 1.25 inches, configured to receive threaded cable glands 68. More specifically, in some embodiments, the through-holes 38-40 can be 0.75-inch, 1-inch, or 1.25-inch welded female NPT (National Pipe Thread) ports. In one embodiment, the through-holes 70-74 can be welded female ports, where the port body extends inside the interior enclosure 18.

Figure 16:
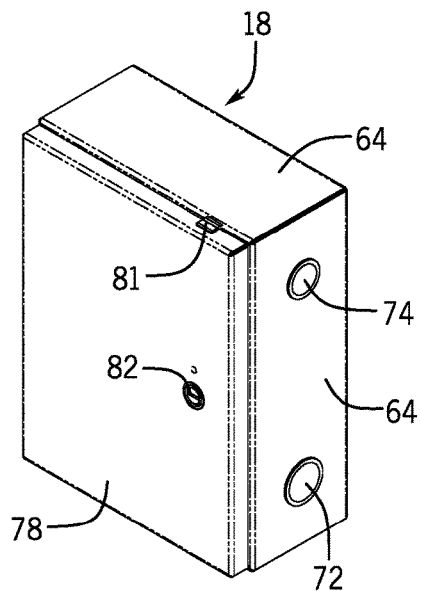
FIG. 16 is a front perspective view of an interior enclosure of the fire-rated three-way splice assembly of FIG. 12.
Figure 18:
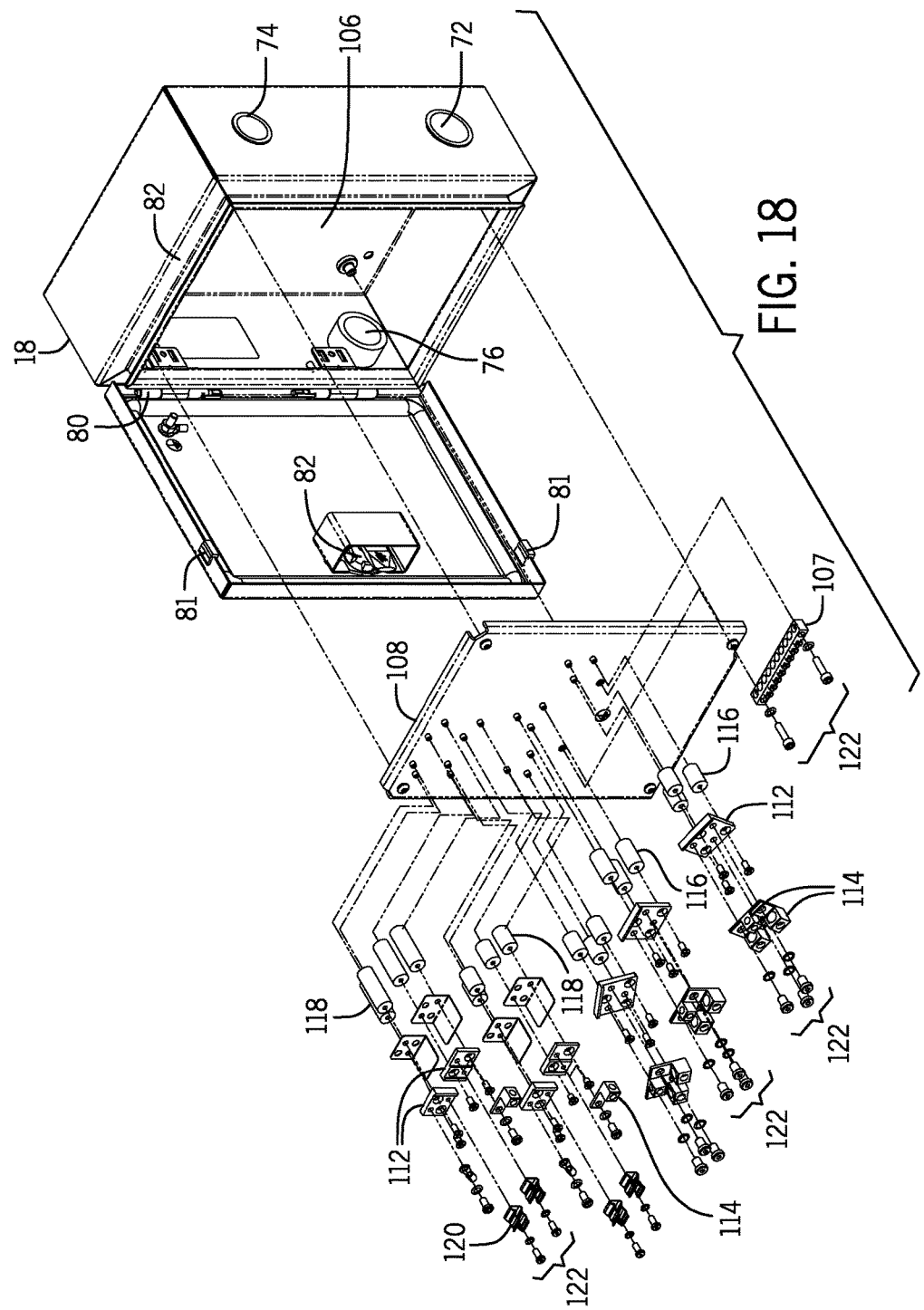
FIG. 18 is a perspective partial exploded view of the interior enclosure of FIG. 16 and the terminal configuration of FIG. 17.

Generally, the interior enclosure 18 can be enclosed on five closed sides 64 with an open front 76, and have a door 78 configured to cover the open front so that, when closed, encloses and substantially seals an inside of the interior enclosure 18 and, when open, provides access inside the interior enclosure 18, as shown in FIGS. 1 and 2. As shown in FIGS. 4A, 16, and 18, the door 78 can be hinged on one side (e.g., via hinges 80) and can include a latch 82 that locks the door 78 in the closed position to substantially seal the enclosure 18. Also, in some embodiments, as shown in FIGS. 16 and 18, the door 78 can include one or more bump stops 81 configured to contact a portion 83 of the sides 64. Alternatively, in some embodiments, the interior enclosure 18 can include a door 78 that can be completely removed from the enclosure and coupled to the rest of the enclosure via fasteners (not shown).

Generally, the interior enclosure 18 can be configured to substantially seal out elements in order to protect electrical connections within the interior enclosure 18. More specifically, MI cables 12 routed into the splice assembly 10 (i.e., through the ports 24-28) are physically and electrically connected inside the interior enclosure 18, and the interior enclosure 18 can be configured to seal out moisture, dirt, and other elements from these connections. Thus, in some embodiments, the interior enclosure 18 can be configured to seal out elements in compliance with a NEMA Type 4 rating. As such, the interior enclosure 18 can be made of aluminum or stainless steel of about 0.080-inch thickness. In other embodiments, however, the interior enclosure 18 can be configured to seal out elements in compliance with another NEMA type rating.

As described above, the MI cables 12 can be routed through the ports 24-28 and into the interior enclosure 18. More specifically, an MI cable 12 can be routed through a through-hole 38-42 of the exterior enclosure 14, a through-hole 58-62 of the insulation 16, and a through-hole 70-74 of the interior enclosure 18. The MI cable 12 can also be physically coupled to the interior enclosure 18 via the cable gland 68 and inner threading of the through-hole 70-74. According to one example, cables of a main power line and a branch circuit can be routed through the ports 24-28 in order to connect the branch circuit (such as a lighting circuit) to the main power line. In such applications, as shown in FIGS. 2 and 12, the first port 24 can be an inlet port for a main power input line 30, the second port 26 can be an outlet port for a main power output line 32, and the third port 28 can be a port for a branch circuit line 34. For reference purposes, the first port 24 and the second port 26 are shown and described as inlet and outlet ports, respectively; however, it is contemplated that the first port 24 may be an outlet port for a main power output line 32 and the second port 26 may be an inlet port for a main power input line 30. Alternatively, each main line 30, 32 may instead be considered an input/output line. In other words, the main power input line 30 may instead be considered a first main power line (e.g., to be routed through the first port 24), and the main power output line 32 may be considered a second main power line (e.g., to be routed through the second port 26).

To facilitate splicing connections within the interior enclosure 18, the MI cables 12, which for example consist of an outer sheath surrounding conductors packed in mineral insulation, can be terminated and routed into the interior enclosure 18. Furthermore, as shown in FIG. 2, each terminated cable 12 can include a sealing pot 84 and a cable gland 68 having a gland body 86 and a gland nut 88. To terminate and install a cable 12, according to one example, the cable gland 68 is placed over an end of the cable 12. The cable 12 is then terminated at its end by stripping away the sheath, sealing the exposed insulation against outside elements, and exposing the conductors. More specifically, the cable end is stripped, then the exposed mineral insulation is sealed by placing the sealing pot 84 on the stripped end over the exposed insulation and setting a sealing compound within the sealing pot 84. Once sealed, the cable end is routed through the through-holes 38-42, 58-62, and the gland body 86 is coupled to a through-hole 70-74 by engaging threading on the gland body 86 with the threading of the through-hole 70-74. Then, the cable gland 68 is tightened against the cable 12 by rotating the gland nut 88, which is located outside the enclosure 18. An operator can access the gland nut 88 to tighten it (e.g., with a wrench) via the air gap 36 between the enclosure 18 and the insulation layer 16.

The threaded connection between the cable gland 68 and the through-holes 70-74 can physically couple the cable 12 to the splice assembly 10 as well as seal the terminated cable ends, including the exposed conductors, and the inside of the interior enclosure 18 from outside elements. More specifically, the threaded connection can help prevent moisture, dust and other elements, as well as flames, from entering the interior enclosure 18 via the through-holes 70-74. Furthermore, the threaded connection between the cable gland 68 and the through-holes 70-74 can provide a ground connection from the cable sheath to the splice assembly 10.

Figure 14:
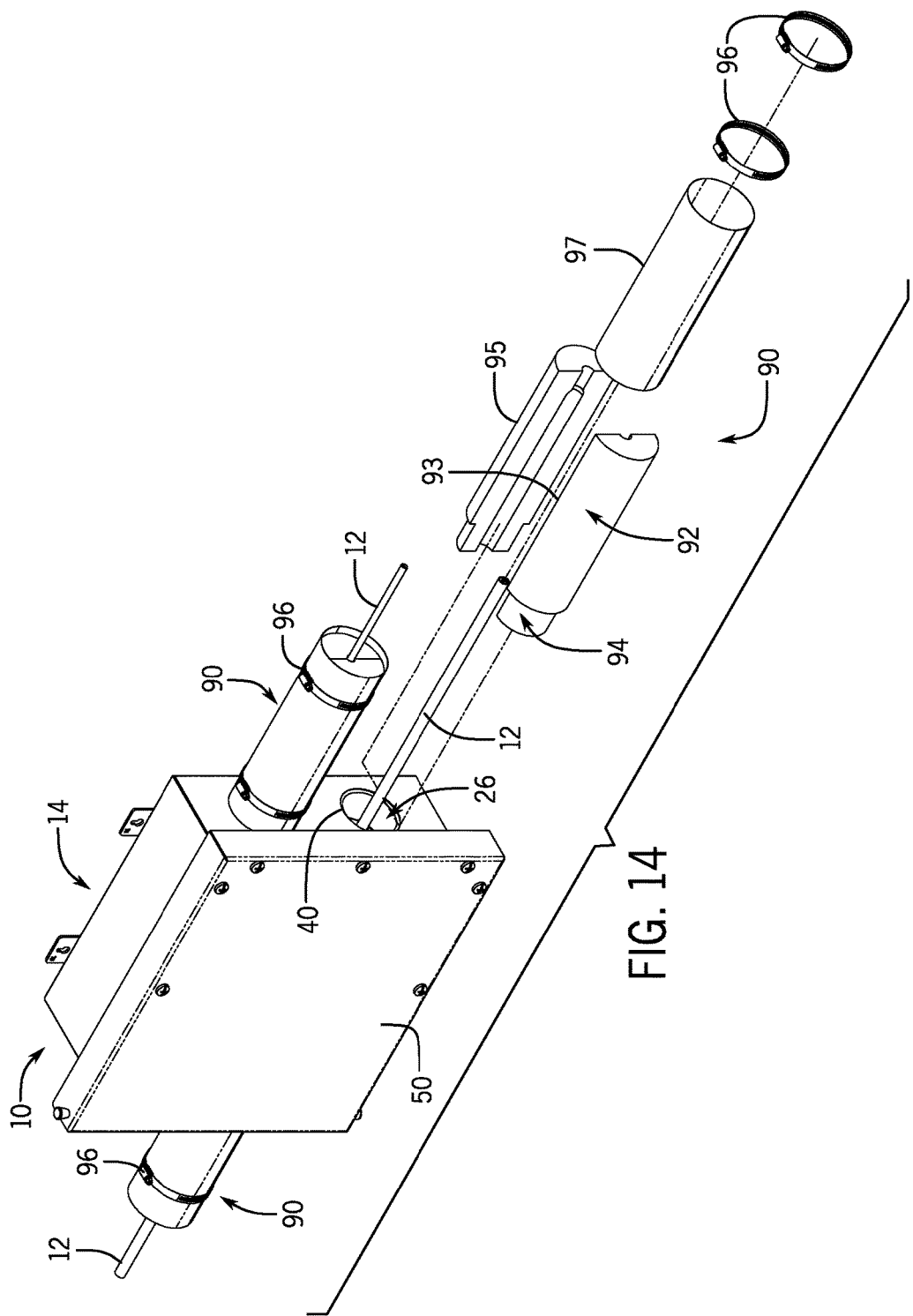
FIG. 14 is a front perspective, partial exploded view of the fire-rated three-way splice assembly of FIG. 12.

With respect to the through-holes 58-62 of the insulation 16 and the through-holes 38-42 of the exterior enclosure 14, insulation collars 90 can be used to partially or substantially seal the respective through-holes 38-42, 58-62 from heat and/or flames. For example, as shown in FIGS. 2 and 12-14, an insulation collar 90 can be fitted or wrapped around a portion of the outer sheath of each MI cable 12. A first section 92 of the insulation collar 90 can have an outer diameter larger than the through-holes 38-42, 58-62, while a second section 94 of the insulation collar 90 can have an outer diameter substantially equal to the diameter of the through-holes 38-42, 58-62. In use, the insulation collar 90 can be wrapped or fitted around each cable 12 outside the splice assembly 10, then the second section 94 can be slid into the through-holes 38-42, 58-62 until the larger, outer diameter of the first section 92 abuts an outer surface of the side 44 of the exterior enclosure 14. As a result, the insulation collar 90 can substantially seal or close off the through-holes 38-42, 58-62 via a press-fit. In some embodiments, as shown in FIG. 14, the insulation collar 90 can include a first piece 93 and a second piece 95 configured to fit around a cable 12, and a cladding 97 (e.g., stainless steel cladding) configured to fit around or slide over the pieces 93, 95 to maintain the pieces 93, 95 around the cable 12. Furthermore, in some embodiments, as shown in FIGS. 2 and 12-14, one or more circular clamps 96 can be secured around each larger outer diameter of the insulation collar 90 to maintain the insulation collar 90 around the MI cable 12.

The insulation collars 90 can help slow down heat transfer into the splice assembly 10 via the MI cables 12, for example, in the case of a fire. Furthermore, an additional sealant (not shown) may be used around the cables 12 and/or around the insulation collars 90 to help substantially seal the through-holes 38-42, 58-62. For example, firestop caulking can help seal the inside of the exterior enclosure 14 from outside elements and flames. Such caulking or another sealant can be applied around each insulation collar 90 along the second section 94 before inserting the second section 94 into the through-holes 38-42, 58-62. The caulking can also or alternatively be applied around each insulation collar 90 at the connection point where the insulation collar 90 abuts the exterior enclosure 14 and/or at a contact point between the two insulation pieces 93, 95.

Accordingly, the exterior enclosure 14, the insulation 16, the interior enclosure 18, the cable glands 68, and/or the insulation collars 90 can serve as heat and fire protection for cable connections within the interior enclosure 18. To facilitate these interior connections or, more specifically, to facilitate two-way and three-way splicing, the interior enclosure 18 can include one or more terminals 20 positioned within the interior enclosure 18, as well as one or more fuses 22, as shown in FIGS. 1-2, 10A-11, and 17-18. For example, when terminated and routed inside the interior enclosure 18, each exposed conductor of each cable 12 can be coupled to a respective terminal 20. Thus, in some embodiments, the number and configuration of terminals 20 can generally correspond to the number and size of conductors of at least one MI cable 12 being routed into the assembly 10.

In some embodiments, the splice assembly 10 can include, for example, between two and seven terminals in order to accommodate MI cables 12 having two to seven conductors (e.g., a two-conductor configuration, a three-conductor configuration, a four-conductor configuration, a five-conductor configuration, a six-conductor configuration, or a seven-conductor configuration). Additionally, in some embodiments, some terminals may accommodate more than one conductor so that, for example, a splice assembly 10 including five terminals can accommodate a seven-conductor configuration (e.g., where three conductors, such as three ground lines, are grouped together at one terminal). Furthermore, the splice assembly 10 can include terminals 20 configured to electrically connect conductors sized between about 14 AWG (American Wire Gauge) to about 1 AWG. For example, a four-conductor configuration can accommodate 14 AWG to 6 AWG conductors, while a three-conductor configuration can accommodate 14 AWG to 3 AWG conductors or 14 AWG to 2 AWG conductors, and a two-conductor configuration can accommodate 14 AWG to 1 AWG conductors. Other size ranges and configurations are also contemplated by some embodiments of the invention. For example, the assembly 10 of some embodiments may be configured to accommodate any size conductor of a copper or stainless steel MI cable, such as any size conductor from 500 MCM (thousand circular mils, or kcmil) to 16 AWG.

Figure 5:
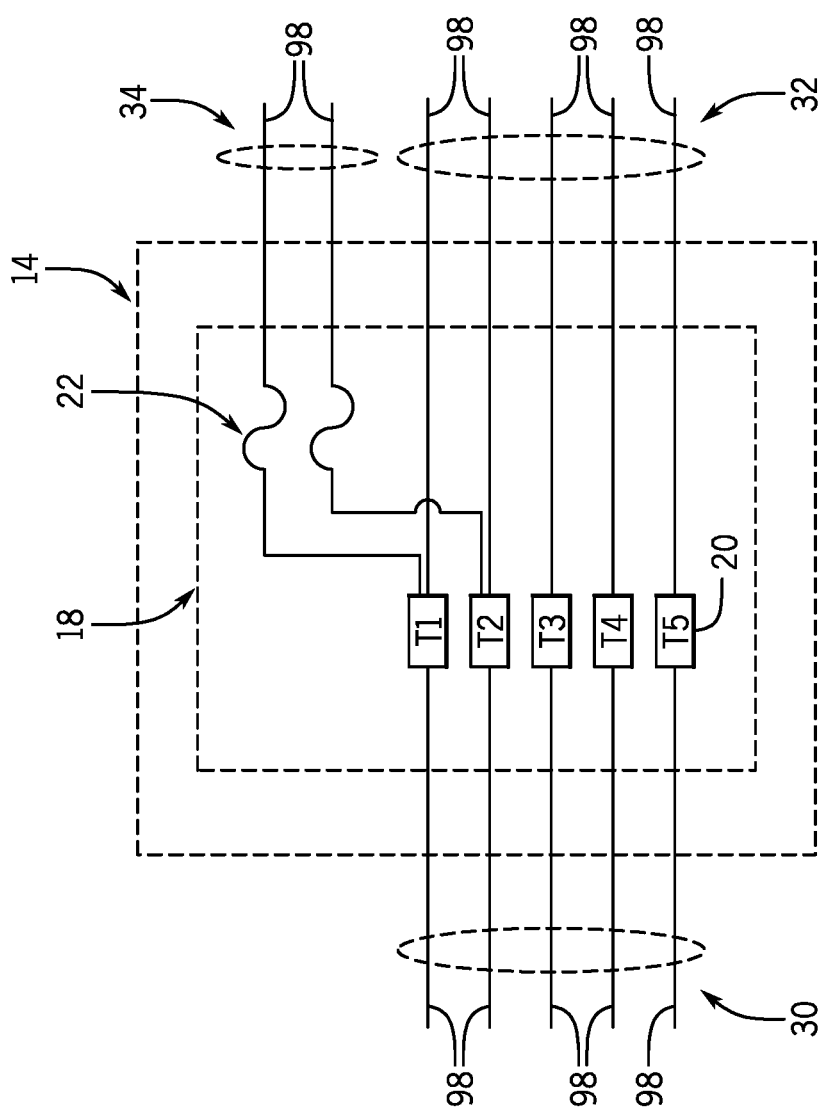
FIG. 5 is a schematic view of electrical connections of a five-conductor main input line, a five-conductor main output line, and a two-conductor branch circuit line within a fire-rated three-way splice assembly according to an embodiment of the invention.

An example five-conductor configuration is shown schematically in FIG. 5. As shown in FIG. 5, the main line cables 30, 32 can include five conductors 98, while the branch circuit cable 34 can include two conductors 98. The five conductors 98 of the main power input line 30 can each be routed to a respective terminal T1-T5. Similarly, the five conductors 98 of the main power output line 32 can each be routed to a respective terminal T1-T5, and the two branch line conductors 98 can be routed to terminals T1 and T2, respectively. Thus, the branch line 34 can splice into the main line 30, 32 (known as a T-splice connection) at terminals T1 and T2, while terminals T3-T5 can each serve as a two-way splice for the additional main line conductors, acting as main line pass-throughs.

FIGS. 6A-9B illustrate additional example splice assemblies 10 for two-, three-, four-, and seven-conductor main line MI cable configurations, respectively, with a branch line 34 of a lighting load (L) that is spliced into the main line 30, 32. For example, in FIGS. 6A-9B, each splice assembly 10 generally receives a main power input line 30 and a main power output line 32, each with respective conductors 98, and a branch line 34 (with two, three, or more conductors 98) connected to a lighting load L. As shown in FIGS. 6A-9B, the splice assemblies 10 can provide, at terminals, three-way splice connections 102 as well as two-way splice connections 104. While a lighting load L is shown and described with respect to FIGS. 6A-9B, other types of electrical loads are contemplated within the scope of the present invention. Additionally, optionally, the systems can include an exterior junction box 100 that can receive the branch line 34 (e.g., to protect two-way splices 104 for branch line connections).

FIGS. 6A-9B also illustrate one or more fuses 22 within each splice assembly 10. Generally, the splice assembly 10 can include the fuses 22 to separate the branch circuit 34 from the main line 30, 32. More specifically, in one embodiment, the fuses 22 can separate the branch circuit 34 from the terminals that facilitate the splice connection 102, 104. As a result, if the branch circuit fails, for example due to a fire, the fuses 22 can cut the connection between the branch circuit 34 and the main line 30, 32, thus protecting the main line 30, 32. In other words, the fuses 22 can facilitate main line circuit integrity in case of a fire that affects the branch circuit 34. In some embodiments, the splice assembly 10 can include one fuse 22 for each conductor 98 of the branch circuit 34. In other embodiments, the splice assembly 10 can include a fuse 22 for each live (or "phase") line of the branch circuit 34, but not for a neutral line, as illustrated in FIGS. 6A-9B. Additionally, in some embodiments, the splice assembly 10 may not include any fuses 22.

Figure 6A:
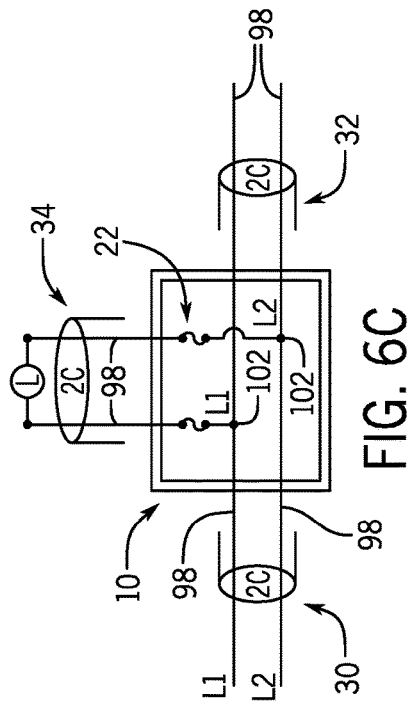
FIGS. 6A-6D illustrate wiring diagrams for a fire-rated three-way splice assembly configured to splice a branch circuit with a two-conductor main line.
Figure 6B:
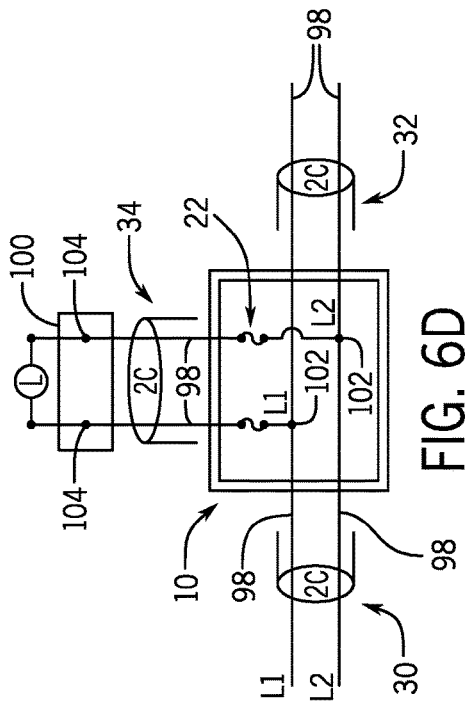
Figure 6C:
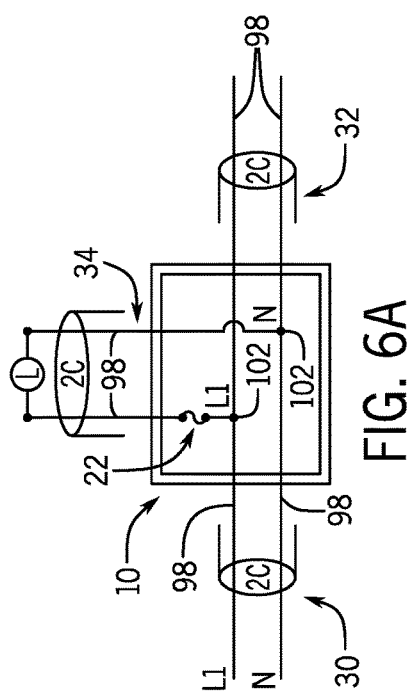
Figure 6D:
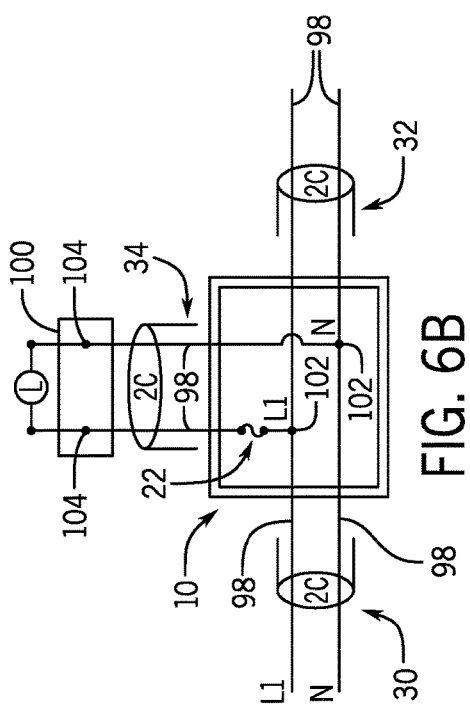
Figure 7A:
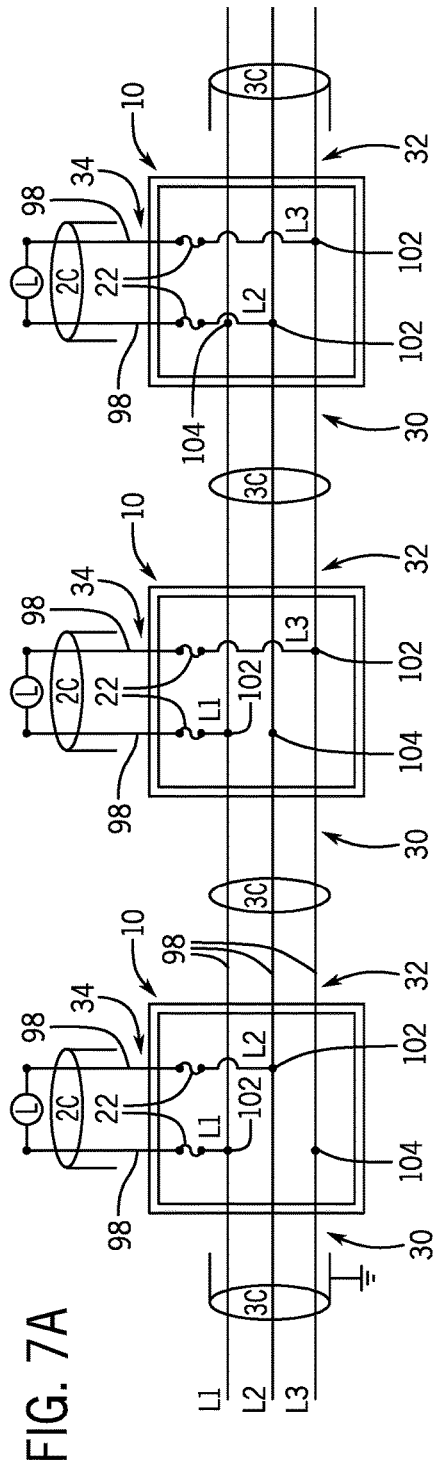
FIGS. 7A-7B illustrate wiring diagrams for a fire-rated three-way splice assembly configured to splice a branch circuit with a three-conductor main line.
Figure 7B:
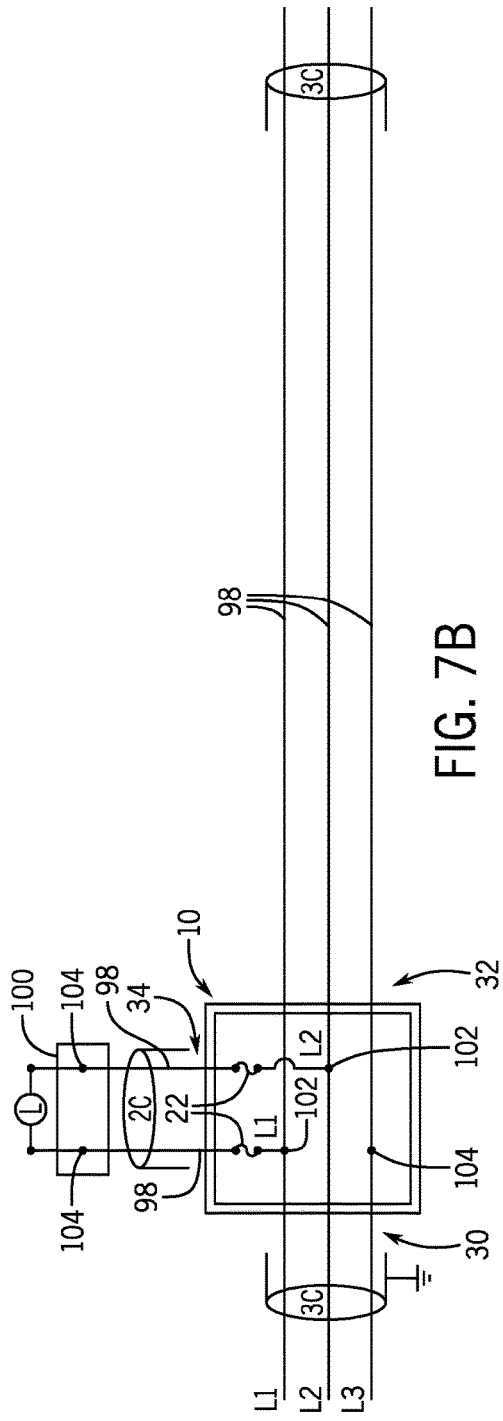

For example, FIGS. 6A-6D illustrate a two-conductor cable configuration, where FIGS. 6A and 6B illustrate a phase-to-neutral configuration with and without a junction box 100, respectively, and FIGS. 6C and 6D illustrate a phase-to-phase configuration with and without a junction box 100, respectively. Each phase line 98 of the branch circuit 34 in FIGS. 6A-6D is connected to a three-way splice 102 via a fuse 22. FIGS. 7A and 7B illustrate three-conductor cable configurations, where FIG. 7A illustrates three separate branch circuits 34 spliced into the main line 30, 32 via three splice assemblies 10, and FIG. 7B illustrates a single splice assembly 10 receiving a branch circuit 34 connected through a junction box 100. FIGS. 8A and 8B illustrate four-conductor cable configurations, where FIG. 8A illustrates three separate branch circuits 34 spliced into the main line 30, 32 via separate splice assemblies 10, and FIG. 8B illustrates a single splice assembly 10 receiving a branch circuit 34 connected through a junction box 100. FIGS. 9A and 9B illustrate a seven-conductor configuration with and without a junction box 100, respectively. In FIGS. 9A and 9B, the branch circuit 34 includes a phase line 98, a neutral line 98, and a dedicated ground line 98, thus resulting in three three-way splices 102 with the main line 30, 32. Additionally, when circuits include multiple ground lines, all ground lines can be bussed to a common ground, as shown in FIGS. 9A and 9B, or may each be separately spliced together.

Figure 11:
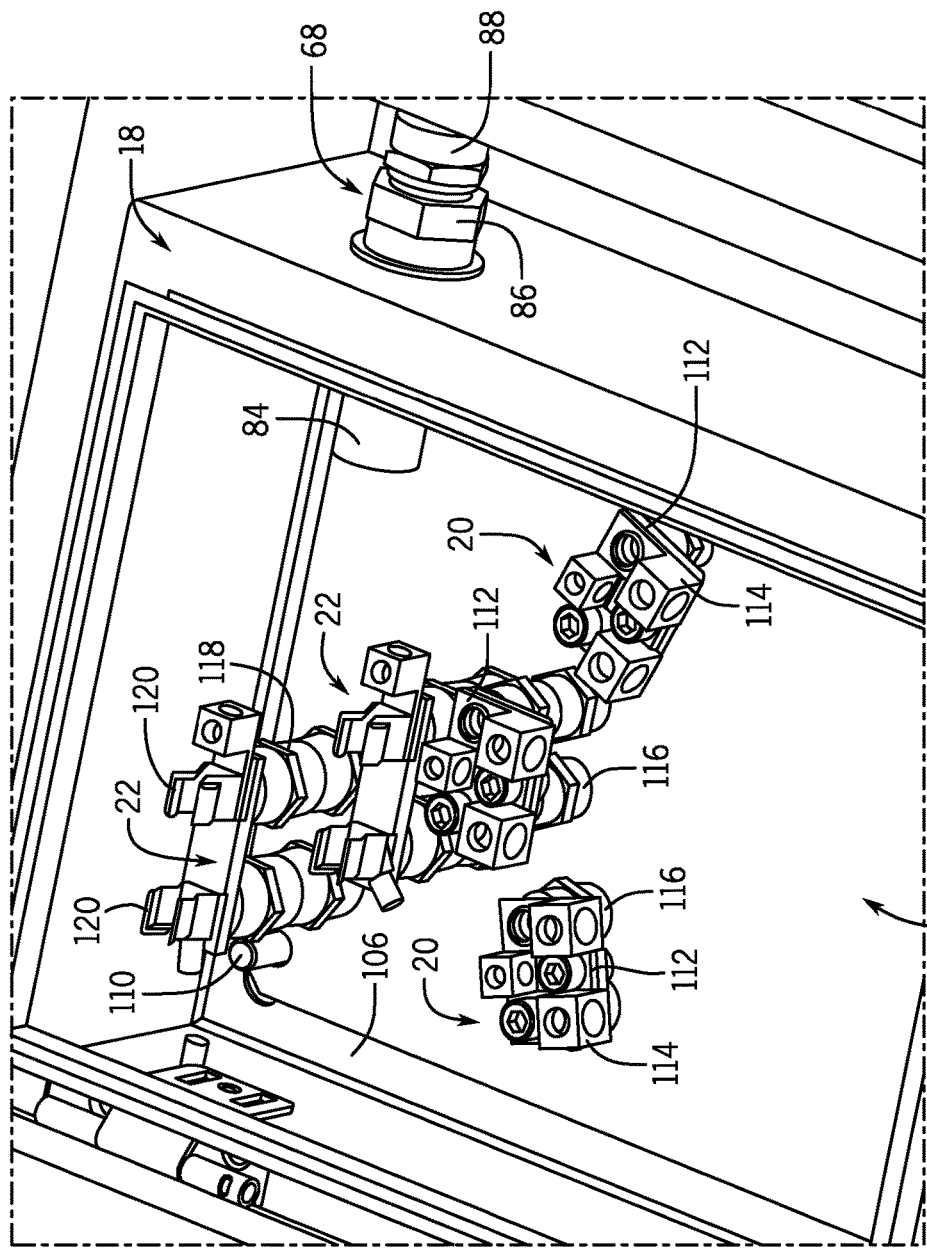
FIG. 11 is a front perspective view of terminals and fuses of the fire-rated three-way splice assembly of FIG. 1.

In some embodiments, for any of the above-described configurations, the terminals 20 and the fuses 22 can be coupled to an inner surface of the interior enclosure 18, such as a rear inner surface 106. In other embodiments, the terminals 20 and the fuses 22 can be coupled to a separate mounting pan 108, which can then be permanently or removably coupled to the rear inner surface 106 (for example, via welded studs 110, as shown in FIG. 11, or other fasteners). For example, FIGS. 10A-10D illustrate different configurations of terminals 20 and fuses 22 coupled to a mounting pan 108 within the interior enclosure 18, including a two-terminal configuration (FIG. 10A), a three-terminal configuration (FIG. 10B), a four-terminal configuration (FIG. 10C), and a four-terminal configuration (FIG. 10D). Additionally, FIG. 10D illustrates a neutral bar 107 to permit ground conductors from the branch circuit 34 and the main line 30, 32 to be bussed to a common ground. By utilizing a removable mounting pan 108, a single splice assembly 10 can serve any type of MI cable configuration. More specifically, if new or replacement MI cables 12 are different in size and/or number of conductors than previous cables, therefore requiring a different terminal configuration, only the mounting pan 108—not the entire splice assembly 10—needs replacing.

Generally, the terminals 20 and the fuses 22 can be sized and configured to be spaced from the surface 106 and each other in accordance with standard electrical working clearances. For example, as shown in FIG. 11, which generally corresponds to the terminal configuration shown in FIG. 10B, each terminal 20 can include a busbar 112, one or more mechanical lugs 114, and one or more electrical standoffs 116. The lugs 114 and the busbar 112 can facilitate mechanical and electrical connection between conductors 98 while the standoff 116 can facilitate mechanical coupling of the terminal 20 to the mounting pan 108 or the inner surface 106 of the interior enclosure 18. The standoff 116 can also provide sufficient spacing or clearance between the surface 106 or the mounting pan 108 and the busbar 112. In some embodiments, the terminals can be rated for 600 volts. Additionally, in some embodiments, the fuses 22 can include midget-type UL-rated fuses mounted on UL fuse holders, blocks, or custom spacers having UL and/or UR components. In some embodiments, the fuses 22 can be standard fuses with copper fuse clips 120, coupled to a ceramic or thermoset standoff 118. In one embodiment, the fuses 22 can about 10 millimeters by about 38 millimeters, rated for about 1/10 amps to about 30 amps.

Figure 17:
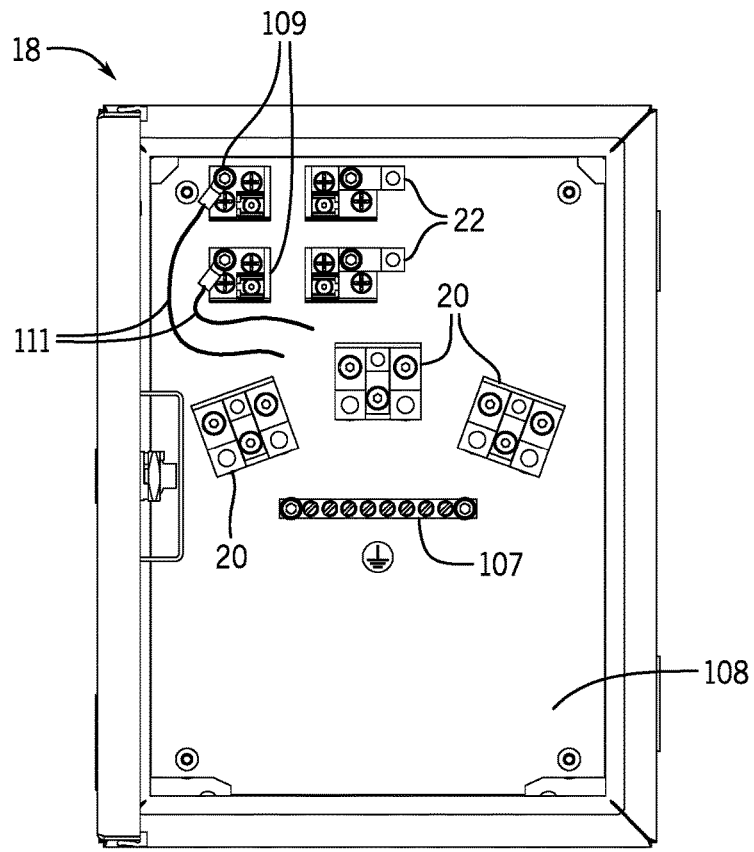
FIG. 17 is a front view of a terminal configuration for the fire-rated three-way splice assembly of FIG. 12, operable with a three-conductor main line.

Additionally, FIGS. 17 and 18 illustrate another terminal configuration example, according to some embodiments. More specifically, FIGS. 17 and 18 illustrate a three-terminal configuration, having three terminals 20 to accommodate up to three main line conductors 90 for three-way splicing, two fuses 22 to accommodate up to two branch circuit conductors 90 (although one fuse 22 may be used if the branch circuit 34 includes a phase line-neutral line configuration), and a neutral bar 107 to accommodate up to eight ground conductors of the main line 30, 32 and/or the branch circuit 34. Additionally, as shown in FIG. 17, the assembly 10 may include branch terminals 109 with pre-terminated wires 111 to assist end-user branch circuit connections. As shown in FIG. 18, the configuration can include busbars 112, mechanical lugs 114, terminal standoffs 116, fuse standoffs 118, fuse clips 120, and respective fasteners 122. As shown, the standoffs 116, 118 can include varying lengths to permit spacing of the components from the mounting pan 108 and from each other in accordance with standard electrical working clearances.

According to the above-described embodiments, the assembly 10 can generally provide a three-way splice that is mechanically protected via a NEMA Type 4 interior enclosure and an insulated exterior enclosure, and electrically protected via one or more fuses between a main power line and a spliced branch circuit. Furthermore, the assembly 10 can be substantially light-weight, for example, to permit installation by a single operator. For example, in one embodiment, the assembly 10 can weigh about 45 pounds (and about 33 pounds without the door 50). And given its heat protection characteristics and, more specifically, the insulation 16, 90, the assembly 10 of some embodiments can be fire-rated or fire-listed under the UL 2196 standard. In particular, the assembly 10 can be at least one-hour fire-rated under UL 2196, which means that the assembly 10 is capable of protecting the interior splices for circuit operation up to one hour of gradually increasing temperatures up to 1700 degrees Fahrenheit. This one-hour fire rating, permitting the assembly to be a complete UL-listed or cULus-listed three-way splice solution, may be beneficial for lighting circuits, such as in underground rail, road, subway, and tunnel applications. As such, the assembly 10 can also be compliant with fire protection and life safety requirements under National Fire Protection Association (NFPA) 130 standard (for underground, surface, and elevated fixed guideway transit and passenger rail systems) and NFPA 502 standard (for limited access highways, road tunnels, bridges, elevated highways, depressed highways, and roadways between airtight structures). Accordingly, the assembly 10 can provide a light-weight, turnkey solution for a fire-rated three-way splice with fuse protection.

Additionally, in some embodiments, the assembly 10 can be configured as a two-hour fire-rated assembly under UL 2196, which means that the assembly 10 is capable of protecting the interior splices for circuit operation up to two hours of gradually increasing temperatures up to 1850 degrees Fahrenheit. As MI cables themselves are two-hour rated, the assembly 10 and the cables 12 can be used in, for example, emergency power and fire system applications.

While embodiments of the assembly 10 are described above for use in lighting or emergency power or fire system applications, it is also contemplated for the assembly 10 to be used in other electrical applications. Additionally, while embodiments of the assembly 10 described above refer to three-way splices or T-splices, one or more features of the assembly 10 may be incorporated to provide a fire-rated, fuse-protected two-way splices in some embodiments.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, any of the features or functions of any of the embodiments disclosed herein may be incorporated into any of the other embodiments disclosed herein.

What is claimed is:

1. A three-way splice assembly for splicing together a first cable, a second cable, and a third cable, the three-way splice assembly comprising:

an exterior enclosure;
an interior enclosure positioned within the exterior enclosure;
an insulation layer positioned between the exterior enclosure and the interior enclosure, wherein the insulation layer is positioned within the exterior enclosure to define an air gap between an outer surface of the interior enclosure and the insulation layer;
a first port, a second port, and a third port each extending from the exterior enclosure, through the insulation layer, and into the interior enclosure and each sized to receive one of the first cable, the second cable, and the third cable, respectively;
a terminal located within the interior enclosure and configured to electrically connect a respective conductor from the first cable, the second cable, and the third cable to form a three-way splice; and
a fuse located within the interior enclosure and configured to be electrically connected between the terminal and one of the conductors of the first cable, the second cable, and the third cable.

2. The three-way splice assembly of claim 1, wherein the first port includes a first through-hole through the exterior enclosure, a second through-hole through the insulation layer, and a third through-hole through the interior enclosure.

3. The three-way splice assembly of claim 2, wherein the first through-hole and the second through-hole are substantially equal in size, and the first through-hole and the second through-hole each are each sized to receive the first cable surrounded by an insulation collar.

4. The three-way splice assembly of claim 3, wherein the third through-hole is smaller than the first through-hole and the second through-hole, and the third through-hole is sized to receive a first cable gland coupled to the first cable.

5. The three-way splice assembly of claim 4, wherein the third through-hole includes threading configured to engage mating threading of the first cable gland in order to couple the first cable to the interior enclosure.

6. The three-way splice assembly of claim 2 and further comprising an insulation collar configured to surround the first cable and to be routed through the first through-hole and the second through-hole.

7. The three-way splice assembly of claim 6, wherein the insulation collar includes a first section with a first diameter larger than a diameter of the first through-hole, and a second section with a second diameter substantially equal to the diameter of the first through-hole, wherein the second section is configured to be routed through the first through-hole until the first section abuts an outer surface of the exterior enclosure.

8. The three-way splice assembly of claim 1, wherein the insulation layer is positioned against an inner surface of the exterior enclosure.

9. The three-way splice assembly of claim 1, wherein the terminal includes one of two terminals, three terminals, four terminals, and five terminals and each of the terminals electrically connects a respective conductor from at least two of the first cable, the second cable, and the third cable.

10. The three-way splice assembly of claim 1, wherein the exterior enclosure includes a door configured to provide access to an inside of the exterior enclosure.

11. The three-way splice assembly of claim 1, wherein the interior enclosure includes a door configured to provide access to an inside of the interior enclosure.

12. The three-way splice assembly of claim 1, wherein the exterior enclosure includes at least one mounting bracket.

13. The three-way splice assembly of claim 1, wherein the insulation layer surrounds all sides of the interior enclosure.

14. A three-way splice assembly for connecting a branch circuit line to a main power line including a first main power line and a second main power line, each of the branch circuit line, the first main power line, and the second main power line including a mineral insulated cable having at least one conductor, the three-way splice assembly comprising:
an exterior enclosure;
an interior enclosure positioned within the exterior enclosure;
an insulation layer positioned between the exterior enclosure and the interior enclosure, wherein the insulation layer is positioned within the exterior enclosure to define an air gap between an outer surface of the interior enclosure and the insulation layer;
a first port extending from the exterior enclosure, through the insulation layer, and into the interior enclosure and sized to receive the first main power line;
a second port extending from the exterior enclosure, through the insulation layer, and into the interior enclosure and sized to receive the second main power line;
a third port extending from the exterior enclosure, through the insulation layer, and into the interior enclosure and sized to receive the branch circuit line;
a terminal located within the interior enclosure and configured to electrically connect a respective conductor from the first main power line, the second main power line, and the branch circuit line to form a three-way splice; and
a fuse located within the interior enclosure and configured to be electrically connected between the terminal and the conductor of the branch circuit line.

15. The three-way splice assembly of claim 14 and further comprising:
a first cable gland configured to be coupled to a terminated end of the first main power line and to couple the first main power line to the interior enclosure;
a second cable gland configured to be coupled to a terminated end of the second main power line and to couple the second main power line to the interior enclosure; and
a third cable gland configured to be coupled to a terminated end of the branch circuit line and to couple the branch circuit line to the interior enclosure.

16. The three-way splice assembly of claim 14 and further comprising a mounting pan coupled to an inner surface of the interior enclosure, wherein the terminal and the fuse are mounted on the mounting pan.

17. A three-way splice assembly for splicing together a first cable, a second cable, and a third cable, the three-way splice assembly comprising:
an exterior enclosure including five closed sides, an open front, and a door configured to cover the open front;
an interior enclosure positioned within the exterior enclosure, the interior enclosure including five closed sides, an open front, and a door configured to cover the open front;
an insulation layer positioned between the exterior enclosure and the interior enclosure, wherein the insulation layer is positioned within the exterior enclosure to define an air gap between an outer surface of the interior enclosure and the insulation layer;
a first port, a second port, and a third port each extending from the exterior enclosure, through the insulation layer, and into the interior enclosure and each sized to receive one of the first cable, the second cable, and the third cable, respectively; and a terminal located within the interior enclosure and configured to electrically connect a respective conductor from the first cable, the second cable, and the third cable to form a three-way splice.

18. The three-way splice assembly of claim 17 and further comprising:

a first insulation collar configured to surround a portion of the first cable and extend partially through the first port;

a second insulation collar configured to surround a portion of the second cable and extend partially through the second port; and a third insulation collar configured to surround a portion of the third cable and extend partially through the third port.

19. The three-way splice assembly of claim 1, further comprising: a mounting pan coupled to an inner surface of the interior enclosure, wherein the terminal and the fuse are mounted on the mounting pan.

20. The three-way splice assembly of claim 14, further comprising: a first insulation collar configured to surround a portion of the first cable and extend partially through the first port; a second insulation collar configured to surround a portion of the second cable and extend partially through the second port; and a third insulation collar configured to surround a portion of the third cable and extend partially through the third port.

* * * * *